United States Patent Office
3,440,181
Patented Apr. 22, 1969

3,440,181
METAL COATED VERMICULAR EXPANDED GRAPHITE AND POLYMER COMPOSITION CONTAINING SAME
Franciszek Olstowski, Freeport, Tex., assignor to The Dow Chemical Company, Midland, Mich., a corporation of Delaware
No Drawing. Filed Mar. 22, 1965, Ser. No. 441,844
Int. Cl. H01b 1/04; B32b 15/04; C08h 17/08
U.S. Cl. 252—503          10 Claims

ABSTRACT OF THE DISCLOSURE

This invention relates to metal coated vermicular graphite compositions containing from about 2 to about 85 weight percent metal, having an apparent bulk density of from about 0.3 to about 15 lbs./ft.$^3$ and a surface area of from about 0.1 to about 15 square meters/gm. The invention also relates to a method for producing electrically conductive polymer compositions by uniformly dispersing from 5 to 60 weight percent of a metal coated vermicular graphite into a solid organic polymer.

---

This invention relates to a metal-coated graphite and more particularly concerns metal-coated vermicular expanded graphite particles which have extremely low bulk densities.

In general, the composition of matter of the present invention is comprised of vermicular expanded graphite particles coated with a metal in an amount of from about 2 to about 85 percent by weight based on total composition of the metal-coated particles. The metal forming the coating on said graphite particles can be characterized as being normally solid, nonpyrophoric, and relatively stable in normal atmospheres. Such metals as Hg, Ga and the alkali metals are not suitable for use in this invention. The instant metal-coated vermicular expanded graphite product is further characterized as (1) having an apparent bulk density within the range of from about 0.3 to about 15 lb./ft.$^3$ (said bulk density includes the bulk densities of the vermicular graphite and the metal coating), (2) containing enclosed voids ranging from about 10 to 40 volume percent or more of the total apparent volume of the metal-coated vermicular mass, (3) having a low specific resistivity (that is a high electrical conductivity) ranging from about 0.1 ohm inch to as low as 10 micro-ohm inches, (4) having low thermal conductivity ranging from about 0.7 to about 15 B.t.u./hour/ft.$^2$/°F./in., (5) having a surface area ranging from about 0.1 to about 15 square meters per gram (m.$^2$/gm.), (6) substantially chemically inert to normal atmospheric conditions, the chemical inertness being the same as the metal portion, (7) substantially thermally inert (i.e. non-thermally degradable) and capable of withstanding temperatures up to the melting point of the particular metal with which the product is coated.

The instant metal-coated vermicular expanded graphite particles can be easily incorporated into a normally substantially non-conductive solid organic polymer thereby rendering said solid polymer conductive.

Vermicular expanded graphite used in the present invention is prepared from particulate naturally occurring crystalline flake graphite and crystalline lump graphite, flake graphite being preferred. The crystalline graphite is given a particular acid treatment and the so-treated flake is heated at certain operable temperatures thereby expanding into the low density vermicular feed stock suitable for use in the present invention. The particle size of graphite to be used is not critical although ordinarily particles of from about 10 to about 325 mesh U.S. Standard Sieve are used.

The actual metal to be used as the coating material for said vermicular expanded graphite is dependent upon the properties desired or required in the final product. Thus, for example, if a highly electrically conductive coated particle is needed, gold, silver, platinum, nickel or copper could be used as the metal coating material. However, if a light weight metal-coated graphite particle is required magnesium or aluminum would be suitable as the coating material. Further, if a metal-coated graphite product having little or no luster is desired cadium or zinc would make an excellent coating material.

Other typical metals suitable for use herein as coating materials for vermicular expanded graphite include, for example, iron, tin, chromium, palladium, rhenium and the like. Any metal which is non-pyrophoric, which melts substantially above room temperature and which is relatively stable to ambient atmospheric conditions is operable for use herein.

Depending upon which one of the several coating metals is to be used and/or the properties desired in the final product the vermicular expanded graphite particle can be coated with a metal by various methods such as, for example, mechanical mixing, or merely dusting the graphite with a powdered form of said metal, vapor plating, electroplating, electroless plating, chemical reduction and chemical decomposition and the like.

In preparing novel metal-coated vermicular expanded graphite by the vapor-plating technique, for example, vermicular expanded graphite is placed a vacuum plating apparatus and while under a pressure of about $10^{-3}$ to about $10^{-6}$ mm. Hg (absolute) is exposed to a source of coating metal in the form of a metal vapor. The vapor-plating technique is especially suited for coating the vermicular particles with chemically reactive metals such as zinc, aluminum and magnesium.

Electro-plating can be used to coat vermicular graphite with highly conductive metals such as for example copper, silver, nickel, gold and the like. In carrying out the method of electro-plating a metal on to the surface of the vermicular graphite, vermicular expanded graphite is usually floated on the surface of an electrolyte containing the metal ions to be coated thereon and an anode of the plating-metal. A power source is attached to the anode and the cathode (said floating vermicular graphite mass being attached cathodically) and the electro-plating is allowed to proceed. During electrolysis, the mass is periodically stirred to equalize the coating thickness forming on said graphite.

Certain heavy metals such as silver, copper, and nickel can be applied as coatings onto the vermicular graphite particles by the method of thermal decomposition. In such a method the graphite is coated with fine powders such as formates, heat-decomposable oxides of said heavy metals or other metal compound which is heat-decomposable to yield the elemental metal. The so-formed free metal remains as a coating on the surface of said graphite particles.

The electroless metal plating process which may be employed herein employ a chemical reducing agent, e.g. sodium hypophosphite, to deposit a metal coating on a surface which either includes or has been pretreated with a catalytic metal. Metals which are catalytic to the electroless metal plating reaction include all those belonging to the platinum metals group, specifically rhenium, rhodium, palladium, osmium, iridium, and platinum, as well as iron, cobalt, and Ni.

Another variation of electroless metal plating is the "silver mirror" method wherein a solution containing silver nitrate and ammonium hydroxide is mixed with a reducing agent (e.g. cane sugar, rochelle salt, or formaldehyde) and immediately placed in contact with the substrate to be coated. After a few minutes, the liquid is decanted or otherwise removed and the excess is washed off. The product is then dried, thereby obtaining a silver-coated substrate.

These and other plating and coating methods are all well known to the art and may be easily practiced by those knowledgeable in this area.

In preparing the expanded graphite for use in the present invention, a particulate natural crystalline graphite is contacted at about room temperature with (1) a mixture of from about 8 to about 98 weight per cent concentrated sulfuric acid (at least about 90 weight percent $H_2SO_4$) and from about 92 to about 2 weight percent concentrated nitric acid (at least about 60 weight percent $HNO_3$) or (2) fuming nitric acid, or (3) fuming sulfuric acid, or (4) concentrated sulfuric acid (at least about 90 weight percent $H_2SO_4$), or concentrated nitric acid (at least about 60 weight percent $HNO_3$) plus at least about 2 weight percent of a solid inorganic oxidizer such as, for example, manganese dioxide, potassium permanganate, chromium trioxide, potassium chlorate and the like. The resulting mix components usually are employed on a weight proportion basis of from about 0.2–2/1 (acid member/graphite). These are maintained in contact for at least about one minute, although a lengthy contact time of hours or days is not detrimental. The acid-treated graphite now expandable, is separated from any excess acid, washed and dried if desired. The acidified graphite is then heated until exfoliation or expansion occurs. The preferred method of heating is to contact the acidified graphite with a hydrocarbon flame (for example, a propane flame).

Alternatively, the graphite material, another method of preparing the expandable graphite which is subsequently expanded for use in the method of the instant invention is to treat with an aqueous peroxy-halo acid, preferably perchloric or periodic acid, using an acid concentration of from about 2 to about 70 weight percent or more and an acid/graphite weight proportion of from about 0.05–2/1. The acid treated graphite, now expandable, is separated from excess acid, and dried if desired and heated to give the expanded feed stock.

The crystalline graphite also can be anodically electrolyzed in an aqueous acidic or aqueous salt electrolyte at an electrolyte temperature of from about 0 to about 80° C. at a minimum cell potential of about 2 volts. The total quantity of electricity passed is equivalent to from about 10 to about 500 ampere-hours per pound of graphite. The electrically treated graphite, now expandable is separated from the electrolyte solution and heated. The so-formed expanded graphite feed stock has a bulk density as low as 0.1 lb./ft.$^3$ and preferably less than about 10 lb./ft.$^3$, but may be as great as about 15 lb./ft.$^3$.

The actual apparent bulk density of the final expanded product is determined in part by the temperature employed in the expansion operation. Satisfactory expansion of the aqueous peroxy-halo acid treated or electrolyzed crystalline material results at temperatures above about 150–200° C. However, ordinarily a gaseous environment having a temperature of from about 500° to about 2000° C. or higher is used. Generally, as the temperature increases, the bulk density of the expanded product decreases. Ordinarily graphite from all the acid treatments set forth hereinbefore are subjected to hydrocarbon fuel flames, e.g. propane torch (flame temperature about 1100° C.), oxyacetylene torch (flame temperature of about 1500° C. or higher) etc. for expansion. Generally, the acid-treated or electrolyzed graphite flake particulate material is placed in contact with the flame thereby to effect expansions of from about 4 to 600 fold substantially instantaneously, e.g. within a second.

The expanded graphite resulting from this process is a vermicular, particulate product having a low apparent bulk density as set forth hereinbefore in comparison to the high density of crystalline graphite starting material. (To illustrate, a commercially available Madagascar flake graphite used as a starting material having a carbon content of greater than 80% and a nominal mesh size of from about 30 to about 50 U.S. Standard Sieve had an apparent bulk density of about 51.2 pounds per cubic foot.) The term "apparent bulk density" as used herein is the density determined from the volume occupied by a given mass of the product subjected to free fall (by gravity) into an open top container, e.g., a graduated cylinder.

In one practical application of the present invention metal-coated vermicular expanded graphite particles, used as an improved metal extender is heterogeneously dispersed within a continuous phase of a normally solid polymer (for example various plastics). The plastics containing metal-coated vermicular graphite particles therein have electrical conductivity values superior to those plastic bodies containing comparable quantities of a highly conductive metal alone dispersed therein.

In preparing such an electrically conductive plastic system, the instant metal-coated expanded graphite is blended into the desired plastic system. The mixture is subsequently shaped and cured by techniques readily known to one skilled in the plastics art.

Ordinarily, in order to obtain a highly conductive plastic composite, metal-coated vermicular graphite should be present in said plastic system to provide amounts of metal of from about 5 to about 60 weight percent of the plastic composite. However, if even lower bulk densities and higher surface lubricities are desired in the final plastic composites, quantities of metal-coated vermicular graphite providing 70 to 80 weight percent or more metal should be used.

Plastic systems which are suitable for use herein can be comprised of a liquid polymer or monomer, or a powdered solid polymer and include, but are not limited to polyethylene, epoxides, polyvinyl chloride, phenol formaldehyde and the like.

Further applications of the metal-coated vermicular expanded graphite of the instant invention reside in preparing extremely low bulk density cohered metallic structures of substantially any predetermined shape or sizes. In preparing such cohered metallic structures the metal-coated particles can be fused or bonded with organic polymers such as organo-silicones, fluorocarbons, polycarbonates, polystyrene and the like.

Additional uses of the composition of the instant invention include low density catalysts (particularly vermicular expanded graphite coated with platinum, palladium or silver); as catalyst supports which require a high specific surface and low bulk density for use in fluidized bed reaction techniques, as a metallic thermal insulation fill; and as a decorative vermicular dispersant in organic or inorganic coatings (particularly the gold or silver plated vermicular graphite).

The following examples are merely illustrative of the instant invention and in no way are meant to limit it thereto.

EXAMPLE I

Vermicular expanded graphite for use in the following examples was prepared as follows:

About 10 parts by weight of commercially available Standard Size No. 1 (U.S. Standard Sieve mesh size of from about 20 to about 60), natural flake graphite was mixed with about 15 parts by weight sulfuric acid and 10 parts by weight nitric acid. The acid-treated graphite flake was maintained at room temperature for about 5 minutes and then was washed free of excess acid. Subsequently, the graphite flake was spread out in a thin layer and was heated to a temperature of about 900° C. by subjecting said graphite to direct contact with a propane flame. The graphite flakes, under flame, expanded to yield long, worm-like structures of exceedingly low-bulk densities having an apparent bulk density of about 0.6 lb./ft.³

Vermicular expanded graphite having an apparent bulk density of about 0.2 lb./ft.³ was prepared by heating portions of said acid-treated graphite to a temperature above 1000° C.

These expanded products were used to prepare a variety of highly conductive, metal-coated products as shown hereinafter.

Run A

A nickel-coated vermicular graphite was prepared in accordance with the following procedure (using an electroless nickel process).

A batch of the vermicular expanded graphite having an initial apparent bulk density of about 0.6 lb./ft.³ was completely wetted with an excess of an aqueous solution containing about 20 percent by weight stannous chloride.

Prior to its introduction into an electroless nickel bath said stannous chloride wetted-vermicular graphite was pretreated with a palladium ion containing solution. For this operation, an aqueous solution of palladium chloride in a dilute aqueous hydrobromic acid solution to provide a solution containing a palladium concentration of about 1 gram per liter was poured over said stannous chloride wetted vermicular graphite mass. The entire mixture was gently stirred for a few minutes at room temperature thereby producing a palladium-activated graphite. After pouring off the excess palladium solution, the vermicular graphite mass was thoroughly washed with distilled water.

The so-treated graphite was stirred into an electroless nickel bath maintained at about 190° F. said bath being prepared by dissolving the following reagents in distilled water at the following concentrations.

| Reagent: | Concentration in grams per liter of distilled water, about |
|---|---|
| Nickel chloride hexahydrate | 20 |
| Sodium hypo phosphite monohydrate | 27 |
| Ethylenediamine tetracetic acid | 8 |
| Glycine | 15 |
| Lead chloride | 0.004 |

An aqueous sodium hydroxide solution was added to the above nickel solution to decrease the hydrogen ion concentration to a pH of about 6.0. The entire mixture was vigorously agitated (using a stirrer driven by an airmotor) for about 10 minutes, thereby resulting in the formation of a nickel-coating on said graphite. The so-formed nickel-coated vermicular expanded graphite was filtered from the solution and dried by heating in an oven at about 80° C.

Examination of the dried metallic-appearing product indicated that it had an apparent bulk density of about 7.85 lb./ft.³. Further the nickel coated worms were found to float on water and also on acetone thereby indicating that these worms contained enclosed gas voids. Chemical analysis of this nickel coated-vermicular graphite product revealed that it contained about 71.5 weight percent nickel.

Run B

Silver-coated vermicular expanded graphite was prepared by reacting the vermicular expanded graphite with a "silvering solution and a reducing solution" using chemical reduction technique.

The reagents used in this procedure were comprised of a "silvering solution" containing the following reagents dissolved in distilled water.

| Reagent: | Concentration per liter of distilled water, about |
|---|---|
| Silver nitrate | grams Ag__ 15 |
| Potassium hydroxide | grams__ 7.5 |
| Ammonium hydroxide (concentrated NH₄OH) | cc__ 10 | and a reducing solution containing the following ingredients:

| Ingredient: | Concentration, about |
|---|---|
| Distilled water | cc___ 800 |
| Sugar | grams__ 80 |
| Concentrated nitric acid | milliliters__ 3 |
| Ethanol | do____ 175 |

Test 1.—About 40 ml. of reducing solution was added in and mixed with about 1 liter of silvering solution and the entire mixture was poured over a vermicular expanded graphite mass having an initial apparent bulk density of about 0.6 lb./ft.³ contained within a one-gallon glass vessel. The washing of the graphite with the silvering solution was repeated three additional times. The contents of the vessel were agitated for a few minutes at room temperatures and the excess solution poured off. The resulting silver-surface graphite was washed with water and then dried by heating in an oven at about 80° C.

Examination of the so-formed silver-coated-vermicular expanded graphite product indicated that said silver-coated-product had the following properties:

(1) An apparent bulk density of about 4.4 lb./ft.³;
(2) Contained about 41.6 weight percent Ag as analyzed by wet methods:
(3) A surface areta of about 3.2 meters²/gram experimentally as calculated by standard nitrogen adsorption techniques;
(4) A thermal conductivity factor, K equal to about 2.3 B.t.u./hr./ft.²/° F./inch in a mean temperature range of from about 73° F. to about 582° F.

Test 2.—Another batch of vermicular expanded graphite having an apparent bulk density of about 0.2 lb./ft.³ (prepared from graphite having a particle size of from about 20 to about 60 mesh) was washed 6 times with said silvering solution. The silvered vermicular expanded graphite product was dried by heating in an oven at about 80° C. When analyzed the so-formed silvered product had the following properties:

(1) Apparent bulk density—about 3.6 lb./ft.³;
(2) Silver content (wet analysis)—about 70 weight percent;
(3) Surface area (as arrived at through nitrogen adsorption method)—2.1 meters²/gram.

Test 3.—Another batch of the same grade of vermicular expanded graphite (apparent bulk density of about 0.2 lb./ft.³), after a single wash with silvering solution resulted in a dried product having the following properties:

(1) Apparent bulk density—about 2.43 lb./ft.³;
(2) Silver content—about 11 weight percent;
(3) Surface area—about 3.1 meters²/gram.

Test 4.—An ultrafine vermicular expanded graphite (apparent bulk density of about 2 lb./ft.³), prepared by thermally expanding an HClO₄-treated fine flake graphite passing through a 325 mesh screen, was contacted with a single wash of said silvering solution. The silvered product thereby produced had the following properties:

(1) Apparent bulk density—about 10.9 lb./ft.³;
(2) Carbon content (by combustion analysis)—about 72.2 weight percent;
(3) Silver content (wet analysis)—about 24.8 weight percent;
(4) Surface area—about 13.5 meters²/grams.

Run C

A thermal decomposition procedure was used in coating vermicular expanded graphite with various metals, as set forth in the following tests.

Test 1.—About 2 grams of vermicular expanded graphite having an apparent bulk density of about 0.2 lb./ft.³ (prepared as described hereinbefore) was *gently blended* by tumbling with about 24 grams of finely powered (—325 mesh) silver oxide (AgO) to yield a silver oxide-coated vermicular graphite. The so-coated graphite was heated to about 400° C. thereby decomposing the silver oxide into elemental silver and yielding a sponge-like silver-coated vermicular graphite product. The so-formed silver coated product was analyzed and found to have the following properties:

(1) Apparent bulk density—about 5.95 lb./ft.$^3$;
(2) Silver content (wet analysis)—about 81.8 weight percent;
(3) Specific resistance in the plane of the wafer (when compressed into a wafer at 10,000 p.s.i.)—15 micro-ohm inches.

Test 2.—About 14 grams of finely powered copper formate (−325 mesh) was blended with about 1 gram of vermicular expanded graphite (apparent bulk density of about 0.2 lb./ft.$^3$) thereby producing a copper formate-coated vermicular graphite. The so-coated graphite was heated in an oxygen-free atmosphere to a temperature of from about 250 to about 300° C. to decompose the copper formate to elemental copper. The so-formed copper coated vermicular expanded graphite product had an apparent bulk density of about 3.56 lb./ft.$^3$ and contained about 67 weight percent copper.

Test 3.—About 2 grams of vermicular expanded graphite having an apparent bulk density of about 0.2 lb./ft.$^3$ was wetted with about 24 grams of a 10 percent by weight $H_7PtCl_6 \cdot 6H_2O$ solution. The so-wetted graphite mass was heated to about 700° C. to yield a platinum-coated vermicular expanded graphite. About 2 grams of the platinum-coated vermicular product were recovered and when analyzed was found to have an apparent bulk density of about 1.42 lb./ft.$^3$ and a platinum content of about 20 weight percent.

Run D

Copper-coated vermicular expanded graphite was prepared by an electrolytic plating method as follows:

About 10 grams of a vermicular expanded graphite, having an apparent bulk density of 0.6 lb./ft.$^3$, were deposited on the surface of an electrolyte, said electrolyte comprising about 50 grams of hydrate copper sulfate, and about 10 cc. of concenerated sulfuric acid in about 500 cc. of water.

A copper anode was submerged in said electrolyte-graphite mixture and a copper screen (attached as a cathode lead) was placed upon the surface of the floating vermicular graphite. The electrodes were connected to a D.C. rectifier as a power source. A cell current of about 5 amperes at a potential of about 9 volts was passed through the electrolyte (that is the plating bath) thereby electroplating said vermicular graphite with copper. About every half-hour the floating graphite mass was stirred to promote the uniform plating of copper on said graphite. After about 7 hours of electrolysis, a bright copper-coated vermicular mass, still floating on the surface of the plating bath, was removed and dried by heating in an oven at about 80° C. The dried product containing some electrolyte impurities weighed about 19 grams and was found to have an apparent bulk density of about 6.24 lb./ft.$^3$. A chemical analysis of the copper-coated graphite product revealed that the product contained about 46.4 weight percent copper.

Run E

Vermicular expanded graphite was plated with gold using the following vapor deposition technique.

A small portion of vermicular expanded graphite, having an initial bulk density of about 0.2 lb./ft.$^3$ was placed in a small laboratory vacuum plating apparatus and a vacuum was pulled on the closed system. A portion of a gold filament was vaporized by resistance heating in the vacuum chamber, said gold vapor coming into contact with the graphite thereby depositing a gold coating thereon. The vermicular graphite was agitated every few minutes to insure an even gold-coating on said graphite. After about 10 minutes of exposure to the gold vapor, a gold-plated vermicular expanded graphite product was recovered. The gold-plated product was examined and found to have the following properties:

(1) Apparent bulk density—about 0.312 lb./ft.$^3$;
(2) Gold content (wet analysis)—about 10 weight percent;
(3) Thermal conductivity—about 0.79 B.t.u./hr./ft.$^2$/°F./in. at about 150° F.

EXAMPLE II

The following runs were carried out to determine the effect that the presence of various forms of silver has on the electrical conductivity of polyethylene.

Run A

The following plastic composites were prepared by blending "microfine" polyethylene powder (having an average particle size of less than about −200 mesh) with one of the following dispersed conducting agents:

(1) Finely divided silver flake having an average particle size of less than about −200 mesh (Silflake No. 131);
(2) A premixed vermicular expanded graphite (having a bulk density of about 0.2 lb. per cubic foot) dusted with the above finely divided silver flake to yield essentially silver-coated graphite "worms";
(3) A silver-coated vermicular expanded graphite prepared by coating via the "silver mirror" process as described hereinbefore in Example I.

After blending the polyethylene powder and the conduction agents, the mixes were compressed at a pressure of about 2000 p.s.i. into wafers (⅛ to ¼ inch thick). The wafers were fused by baking them in an oven at about 130° C. for about 30 minutes and then cut into 1 inch wide strips. The specific resistance of each wafer was measured in the longitudinal direction, their composition and resulting bulk specific resistance being listed in Table I.

TABLE I.—CONDUCTIVITY OF POLYETHYLENE POWDER BLENDED WITH VARIOUS FORMS OF SILVER

| Form of silver | Sample No. | Wt. percent silver in polyethylene | Wt. percent graphite in polyethylene | Specific resistance, ohm-inches |
|---|---|---|---|---|
| Group I: Blended polyethylene powder plus silver flake. | 1 | 60 | --- | .00012 |
| | 2 | 50 | --- | .00056 |
| | 3 | 40 | --- | .0010 |
| | 4 | 33 | --- | .0625 |
| | 5 | 25 | --- | 0.625 |
| | 6 | 20 | --- | 1,000 |
| Group II: Silver powder blended with expanded vermicular graphite (approximate Ag-to-graphite weight ratio of 2.7:1). | 7 | 15.6 | 6.25 | 0.75 |
| | 8 | 29.6 | 11.1 | .0025 |
| Group III: Expanded graphite precoated with silver via the "silver mirror" method to yield a 30 percent by weight Ag-coated product, was blended with polyethylene powder. | 9 | 7 | 13 | .0625 |
| | 10 | 11.1 | 20.2 | .0156 |
| | 11 | 15 | 35 | .000916 |

It should be noted that the silver-dusted vermicular graphite (2.7:1 silver-to-graphite ratio) blended in polyethylene was about 1½ to 2 times as effective as a conductor then as the use of silver powder alone blended with polyethylene and the use of silver-mirror coated vermicular graphite (approximately 1:2 silver-to-graphite ratio) was about 3 to 4 times as effective as a conductor as the use of silver powder alone when blended with polyethylene.

Run B

The following polyethylene compositions were prepared in order to compare the effectiveness of a high density silver-coated flake graphite and a low density silver-coated vermicular graphite as a dispersed conductive agent in said polyethylene.

(1) A commercially available Standard No. 1 grade of natural flake graphite was silver-coated by the "silver mirror process" as described hereinbefore in Example I to yield a product containing about 6.5 weight percent silver. About 8 grams of the silver-coated flake graphite was blended with about 10 grams of "microfine" polyethylene powder (less than about —200 mesh) and the mixture was then compressed at a pressure of about 300 p.s.i., into a ½-inch thick disc having the following composition:

| | Wt. percent, about |
|---|---|
| Silver | 2.9 |
| Graphite | 41.6 |
| Polyethylene | 55.5 |

The so prepared silver coated flake graphite-polyethylene compact was fused by baking in an oven at about 135° C. for about 35 minutes. Its specific resistance was measured and found to be about 21.5 ohm inches.

(2) Another compact was prepared by silver coating vermicular expanded graphite (via "silver mirror" process) to yield about a 3.3 weight percent (of silver) silver-coated vermicular graphite. About 8 grams of this product was blended with about 10 grams of "microfine" polyethylene powder, then compressed into a wafer and baked in a manner identical to the above sample. This compact had the following composition:

| | Wt. percent |
|---|---|
| Silver | 1.47 |
| Expanded graphite | 43.03 |
| Polyethylene | 55.50 |

The silver-coated vermicular graphite-polyethylene composite was found to have specific resistance of about 0.0175 ohm inch. Thus it can be seen that the silver-coated vermicular graphite is a much more efficient extender of silver than the silver-coated flake graphite.

EXAMPLE III

The following runs were carried out to determine what effect the presence of various forms of silver have on the electrical conductivity of epoxides.

Various plastic composites were prepared by blending ten parts of a liquid epoxide comprising essentially diglycidyl ether of p,p'-isopropylidene diphenol and about 1 part by weight diethylene tetraamine hardener plus one of the following dispersed conductive agents:

(1) Finely divided silver (Silflake No. 131).
(2) Expanded vermicular graphite (apparent bulk density of about 0.2 lb./ft.$^3$) previously dusted with a coating of silver powder.
(3) Expanded vermicular graphite coated with silver by the "silver mirror" process.

Each of the mixes were blended, then cast into blocks and allowed to harden. The specific resistance of each composition was measured, the results of which are set forth of Table II.

TABLE II.—CONDUCTIVITY OF AN EPOXIDE BLENDED WITH VARIOUS FORMS OF SILVER

| Form of Silver | Sample No. | Wt. percent silver in the epoxy resin | Wt. percent graphite in the epoxy resin | Specific resistance, ohm-inches |
|---|---|---|---|---|
| Group I: Silver powder alone | 1 | 60 | | 1.5 |
| | 2 | 50 | | 100 |
| | 3 | 33.3 | | 5,000 |
| | 4 | 25 | | 1,250,000 |
| Group II: Silver powder blended with an expanded vermicular graphite (5:1 Ag-to-graphite ratio). | 5 | 21.8 | 4.35 | 2.5 |
| | 6 | 13.9 | 2.78 | 100 |
| | 7 | 7.6 | 1.5 | 1,200 |
| Group III: Silver mirror coated vermicular expanded graphite of 31.2 wt. percent Ag. | 8 | 1.85 | 4.4 | 37.5 |
| | 9 | 4.2 | 9.8 | 0.4 |

It should be noted that silver powder dusted onto the expanded graphite surface yields electrical conductivity values comparable to about 2 to 3 times that of silver powder alone dispersed in an epoxide mix. Furthermore, an adherent coat of silver on expanded graphite (via the silver mirror process) yields composites having conductivity values in excess of about 6 times that of silver powder alone.

In a manner similar to that described in Examples II and III various metal-coated vermicular expanded graphite can be incorporated in various solid polymer systems to improve the conductivity of said polymers. Thus for example, silver, gold, nickel, platinum, iron, copper, palladium, and rhenium-coated vermicular expanded graphite can be incorporated into solid polymeric substances such as polyethylene, epoxides, polyvinyl chloride, phenol formaldehyde and the like thereby greatly improving the electrical conductivities of said polymeric substances.

Various modifications can be made in the instant invention without departing from the spirit or scope thereof, for it is to be understood that I limit myself only as defined in the appended claims.

I claim:

1. A metal-coated graphite composition which comprises vermicular expanded graphite particles coated with a metal in an amount of from about 2 to about 85 weight percent of the metal-coated particle, said metal being characterized as being normally solid and non-pyrophoric, said graphite being further characterized as being substantially chemically and thermally inert to the metal coating, and said metal-coated graphite having an apparent bulk density of from about 0.3 to about 15 lb./ft.$^3$, and having a surface area ranging from about 0.1 to about 15 square meters per gram.

2. The composition of claim 1 wherein the metal is selected from the group consisting of gold, silver, platinum, nickel, copper, iron, tin, cadmium, zinc, chromium, palladium, rhenium, aluminum and magnesium.

3. The composition of claim 1 wherein the metal is silver.

4. The compostion of claim 1 wherein the metal is copper.

5. The composition of claim 1 wherein the metal is gold.

6. The composition of claim 1 wherein the metal is nickel.

7. An electrically conductive polymer composition consisting essentially of a continuous phase of a normally solid polymer having dispersed therein from 5 to 60 percent by weight of a metal-coated vermicular expanded graphite based on the total weight of the composition.

8. The composition of claim 7, wherein said metal-coated vermicular expanded graphite is silver-coated vermicular expanded graphite.

9. The composition of claim 7, wherein said metal-coated vermicular expanded graphite is copper-coated vermicular expanded graphite.

10. The composition of claim 7, wherein said metal-coated vermicular expanded graphite is nickel-coated vermicular expanded graphite.

(References on following page)

References Cited

UNITED STATES PATENTS

| | | |
|---|---|---|
| 1,137,373 | 3/1915 | Aylsworth. |
| 1,191,383 | 7/1916 | Aylsworth. |
| 2,876,139 | 3/1959 | Flowers _____ 117—131 |
| 3,003,975 | 10/1961 | Lewis _____ 252—503 |

LEON D. ROSDOL, *Primary Examiner.*

J. D. WELSH, *Assistant Examiner.*

U.S. Cl. X.R.

117—228, 100; 106—307; 252—62, 511, 447; 260—37